United States Patent
Sasaki et al.

(10) Patent No.: US 11,687,058 B2
(45) Date of Patent: Jun. 27, 2023

(54) INFORMATION PROCESSING METHOD AND INFORMATION PROCESSING APPARATUS USED FOR DETECTING A SIGN OF MALFUNCTION OF MECHANICAL EQUIPMENT

(71) Applicant: CANON KABUSHIKI KAISHA, Tokyo (JP)

(72) Inventors: Tomonori Sasaki, Tokyo (JP); Xinyuan Yao, Kanagawa (JP); Fumito Higuchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 355 days.

(21) Appl. No.: 17/025,266

(22) Filed: Sep. 18, 2020

(65) Prior Publication Data

US 2021/0096532 A1 Apr. 1, 2021

(30) Foreign Application Priority Data

Sep. 26, 2019 (JP) .................................. 2019-175931

(51) Int. Cl.
G05B 19/4065 (2006.01)
G06N 20/00 (2019.01)

(52) U.S. Cl.
CPC ......... G05B 19/4065 (2013.01); G06N 20/00 (2019.01); G05B 2219/34477 (2013.01)

(58) Field of Classification Search
CPC ...... G05B 19/4065; G05B 2219/34477; G06N 20/00

(Continued)

(56) References Cited

U.S. PATENT DOCUMENTS 9,866,161 B1 * 1/2018 Johnson .................... H02P 9/14
11,042,145 B2 * 6/2021 Zhang ................. G06F 11/3447
(Continued)

FOREIGN PATENT DOCUMENTS

JP 2005-92466 A 4/2005
JP 2015-18389 A 1/2015
(Continued)

OTHER PUBLICATIONS

Mokhtari, Sohrab, et al. "A machine learning approach for anomaly detection in industrial control systems based on measurement data." Electronics 10.4 (2021): pp. 1-13. (Year: 2021).*
(Continued)

Primary Examiner — Satish Rampuria
(74) Attorney, Agent, or Firm — Venable LLP

(57) ABSTRACT

An information processing apparatus includes a controller. The controller is configured to obtain a measurement value of a sensor provided in mechanical equipment. The controller is configured to generate a first model by machine learning using the measurement value of the sensor measured in a first period of the mechanical equipment and store the first model in a storage portion. The controller is configured to generate a second model by machine learning using the measurement value of the sensor measured in a second period after a trigger event has occurred in the mechanical equipment and store the second model in the storage portion. The controller is configured to determine a state of the mechanical equipment by using the measurement value of the sensor measured in an evaluation period and the first model and the second model stored in the storage portion.

24 Claims, 12 Drawing Sheets

(58) Field of Classification Search
USPC .................................................... 700/28–37
See application file for complete search history.

(56) References Cited

U.S. PATENT DOCUMENTS

| | | | | |
|---|---|---|---|---|
| 2019/0101891 | A1 | 4/2019 | Iijima | |
| 2019/0310115 | A1* | 10/2019 | Abe | G06N 3/08 |
| 2020/0125970 | A1* | 4/2020 | Toyama | G06N 5/04 |
| 2020/0209842 | A1* | 7/2020 | Koizumi | G06N 20/00 |
| 2020/0285997 | A1* | 9/2020 | Bhattacharyya | G06N 7/005 |
| 2021/0096532 | A1* | 4/2021 | Sasaki | G06N 20/00 |
| 2021/0181732 | A1* | 6/2021 | Sadazuka | G05B 23/0254 |

FOREIGN PATENT DOCUMENTS

| | | | |
|---|---|---|---|
| JP | 2019-28565 | A | 2/2019 |
| JP | 2019-67136 | A | 4/2019 |

OTHER PUBLICATIONS

Akbari, Ali, and Roozbeh Jafari. "Transferring activity recognition models for new wearable sensors with deep generative domain adaptation." Proceedings of the 18th International Conference on Information Processing in Sensor Networks. 2019.pp. 85-96. (Year: 2019).*

Isermann, Rolf. "Modeling and design methodology for mechatronic systems." IEEE/ASME Transactions on mechatronics 1.1 (1996): pp. 16-28. (Year: 1996).*

Isermann, Rolf. "On the design and control of mechatronic systems-a survey." IEEE Transactions on Industrial Electronics 43.1 (1996): pp. 4-15. (Year: 1996).*

Bargiela, Andrzej, and Witold Pedrycz. "Toward a theory of granular computing for human-centered information processing." IEEE Transactions on Fuzzy Systems 16.2 (2008): pp. 320-330. (Year: 2008).*

* cited by examiner $$\text{DEVIATION DEGREE} = \sqrt{(Y1-y1)^2 + (Y2-y2)^2 + (Y3-y3)^2}$$

FIG.9A

NAME: AA MALFUNCTION PREDICTION MODEL

SELECT FEATURE VALUE

| FEATURE VALUE NAME | SELECT |
|---|---|
| FEATURE VALUE A: MAXIMUM VALUE | USE |
| FEATURE VALUE B: MEDIAN | USE |
| FEATURE VALUE C: MAXIMUM VALUE OF SECONDARY DIFFERENTIATION | USE |
| FEATURE VALUE D: AVERAGE VALUE | NOT USE |

NORMAL PERIOD

2017/4/1 10:00:00 ~ 2017/4/3 10:00:00

[GENERATE] [MODIFY]

FIG.9B

POST-LEARNING MODEL LIST     [ADD NEW MODEL]

| MODEL NAME | NORMAL PERIOD | |
|---|---|---|
| AA MALFUNCTION PREDICTION MODEL | 2017/4/1~2017/4/3 | DELETE |
| BB MALFUNCTION PREDICTION MODEL | 2017/7/2~2017/7/5 | DELETE |
| CC MALFUNCTION PREDICTION MODEL | 2017/10/15~2017/10/18 | DELETE |
| DD MALFUNCTION PREDICTION MODEL | 2017/8/16~2017/8/19 | DELETE |

INFORMATION PROCESSING METHOD AND INFORMATION PROCESSING APPARATUS USED FOR DETECTING A SIGN OF MALFUNCTION OF MECHANICAL EQUIPMENT

BACKGROUND OF THE INVENTION

Field of the Invention

The present invention relates to an information processing method, an information processing apparatus, and the like used for detecting a sign of malfunction of mechanical equipment.

Description of the Related Art

An operation status of mechanical equipment can change every second in accordance with change in the state of components and the like thereof. If a state in which the operation status is within an acceptable range is referred to as a normal state and a state in which the operation status is out of the acceptable range is referred to as an abnormal state in consideration of the use purpose of the mechanical equipment, for example, in the case of a manufacturing machine, malfunctions such as manufacture of defective products and stoppage of manufacturing line can occur in the abnormal state.

For example, in the field of machine tools, a detection method using a learning model is attempted for detecting an abnormal state. However, in the case of a machine tool, the operation pattern of motors during processing, kinds of tools used for processing, kinds of workpieces to be processed, and so forth change in accordance with the kind of the processing, and therefore it is difficult to create a learning model that has learned all kinds of processing for general use.

Therefore, Japanese Patent Laid-Open No. 2019-67136 discloses a method of preparing a plurality of learning models corresponding to different kinds of processing and selecting one of the plurality of learning models in accordance with the operation conditions and environmental conditions of the machine tool to perform abnormality detection corresponding to the kind of processing, in other words, the operation status.

In addition, Japanese Patent Laid-Open No. 2019-28565 discloses a technique of detecting a sign of malfunction by generating a model of a normal state by machine learning of data of a period in which the mechanical equipment is in the normal state and evaluating the degree of deviation between the operation status and the normal state model. In addition, it is disclosed to, in the case where erroneous detection is assumed, that is, in the case where the mechanical equipment is in the normal state even though the evaluated degree of deviation is large, update the model by adding data of a period corresponding to the erroneous detection to learned data of a normal period and performing additional machine learning.

As described above, in a machine tool or the like, since malfunctions such as manufacture of defective products and stoppage of manufacturing line can occur in the abnormal state, it is important that occurrence of an abnormal state can be detected quickly. In view of this, the abnormality detection method of Japanese Patent Laid-Open No. 2019-67136 is expected to be effective to some extent. However, it is more important to prevent the abnormality state from occurring.

In a machine tool or the like, to suppress occurrence of abnormality state as much as possible, generally a maintenance operation is performed regularly or not regularly even in the case where the same operation is repetitively performed. Although shortening the intervals between the maintenance operations is effective for increasing the preventive safety, since the manufacturing machine and the like is stopped during the maintenance operation, the operation rate of the manufacturing machine or the like decreases when the frequency of the maintenance operation is excessively increased. Therefore, it is preferable that, when the machine or the like is still in the normal state but the occurrence of the abnormality state is close, this state can be detected. This is because, if approach of the occurrence of the abnormality state can be detected, that is, if occurrence of malfunction can be predicted, maintenance operation of the machine or the like may be performed at that time, and therefore excessive decrease of the operation rate can be suppressed.

In view of this, the method of detecting abnormality disclosed in Japanese Patent Laid-Open No. 2019-67136 is not necessarily a method that enables effectively detecting approach of occurrence of the abnormal state, that is, effectively detecting a sign of malfunction.

Meanwhile, in the method of detecting a sign of malfunction disclosed in Japanese Patent Laid-Open No. 2019-28565, a model of a normal state is generated in advance, and the model is updated by additional learning. However, it is practically difficult to realize high detection precision by applying the method of Japanese Patent Laid-Open No. 2019-28565 to prediction of malfunction in a manufacturing machine or the like.

First, state change occurring in the maintenance operation of the manufacturing machine or the like will be described. Here, for example, in the case where the same processing operation is continuously and repeatedly performed by a manufacturing machine or the like, the state of the manufacturing machine or the like at the start of the processing operation will be referred to as an initial state. That is, the initial state is one mode of normal state of the manufacturing machine or the like.

As described above, in a manufacturing machine or the like, maintenance operation is performed regularly or not regularly even in the case of continuously and repetitively performing the same operation, but the state of the machine changes when the maintenance operation is performed. It should be noted herein that, when maintenance operation is performed in a manufacturing machine or the like, the machine may recover to a state extremely close to the initial state, or may change to a state different from the initial state within the range of normal state.

For example, the manufacturing machine or the like can include parts that need to be regularly cleaned for maintaining predetermined performance, but since the cleaning operation takes time, a plurality of the same kind of parts are prepared and alternately used in some cases. That is, the time required for the maintenance operation, that is, the time in which the manufacturing machine is stopped is shortened by cleaning a used part detached from the machine while using another part attached to the machine and by just exchanging the parts during the maintenance operation.

In this case, even parts of the same kind can have variations within the range of tolerance, and therefore the machine may recover to a state extremely close to the initial state or may change to a state different from the initial state when the parts are exchanged in the maintenance operation. In addition, even if parts are not exchanged in the maintenance operation and the exact same part is cleaned and reattached to the machine, the state of the part does not necessarily recover to the original state completely, the state of the machine can be different from the initial state after the maintenance operation. In addition, similarly, even in the case where the part is replaced by an unused brand-new part in each maintenance operation, the state of the machine after the maintenance operation may be a state extremely close to the initial state or a state different from the initial state depending on the variations of the brand-new parts.

In addition, since the manufacturing machine or the like is constituted by an enormous number of components, even if one part is refreshed to a state identical to the initial state in the maintenance operation, the states of the other parts have changed in accordance with the use history. Therefore, the balance of the machine as a whole may not return to the initial state.

Further, in a manufacturing machine or the like, the maintenance operation is not necessarily the same every time. For example, there is a case where only a part A is replaced among a large number of components such as parts, and there is a case where a part A and a part B are replaced at the same time if necessary.

As described above, the balance between states of a large number of parts constituting the machine or the use history thereof change each time the maintenance operation is performed, and therefore the state of the machine immediately after the maintenance may vary in various ways within the range of the normal state.

Therefore, even though a learning model of an initial state, which is one mode of the normal state, can be generated by causing a learning machine to learn data of immediately after the start of use, it is not easy to generate a learning model covering all variations of the normal state caused by the maintenance operation in advance.

In addition, even if a learning model based on data of the initial state is generated and then the learning model is updated by performing additional learning by adding data of a period corresponding to erroneous detection to the data of the initial state as disclosed in Japanese Patent Laid-Open No. 2019-28565, the precision of determining a sign of abnormal state does not necessarily increase greatly.

For example, there can be a case where the state of a part is changed by the first maintenance operation, thus the value of a detection parameter related to the part becomes discontinuous, and the state immediately after the maintenance is determined as showing a sign of malfunction according to the learning model having learned the initial state. In this case, this is erroneous determination, and therefore the learning model is updated by performing additional learning by adding data corresponding to the erroneous detection to the data of the initial state in the method of Japanese Patent Laid-Open No. 2019-28565. However, the learning model after the update can be a model that excessively decreases the degree of deviation in the period in which the erroneous detection has happened. To increase the detection precision of the sign, parameters need to be adjusted in accordance with the complexity of data input when performing machine learning, and if the additional learning is performed without adjusting the parameters of machine learning, the detection precision can be lowered.

However, checking and adjusting the parameters by an expert of machine learning and updating the learning model each time erroneous detection occurs is a huge load on the management of the manufacturing machine or the like including the machine learning, and is not practical.

In addition, if a learning model is newly generated by using only the data of the period corresponding to erroneous detection instead of performing additional learning, there is a possibility that erroneous detection occurs according to the newly generated learning model in the case where the state of the machine recovers to a state extremely close to the initial state after the next maintenance operation.

Therefore, for a system such as a manufacturing machine or the like which requires maintenance operation for use and in which the state of detection parameters can be changed by the maintenance operation in various ways within the range of the normal state, an information processing method and an information processing apparatus that enable detecting the sign of occurrence of malfunction with high precision have been desired.

SUMMARY OF THE INVENTION

According to a first aspect of the present invention, an information processing method for a controller to determine a state of mechanical equipment, the information processing method includes a measuring step in which the controller obtains a measurement value of a sensor provided in the mechanical equipment, a first storing step in which the controller generates a first model by machine learning using the measurement value of the sensor measured in a first period and stores the first model in a storage portion, a second storing step in which the controller generates a second model by machine learning using the measurement value of the sensor measured in a second period after a trigger event has occurred in the mechanical equipment, and stores the second model in the storage portion, and a determination step in which the controller determines a state of the mechanical equipment by using the measurement value of the sensor measured in an evaluation period and the first model and the second model stored in the storage portion.

According to a second aspect of the present invention, an information processing apparatus includes a controller. The controller is configured to obtain a measurement value of a sensor provided in mechanical equipment, generate a first model by machine learning using the measurement value of the sensor measured in a first period of the mechanical equipment and store the first model in a storage portion, generate a second model by machine learning using the measurement value of the sensor measured in a second period after a trigger event has occurred in the mechanical equipment and store the second model in the storage portion, and determine a state of the mechanical equipment by using the measurement value of the sensor measured in an evaluation period and the first model and the second model stored in the storage portion.

Further features of the present invention will become apparent from the following description of exemplary embodiments with reference to the attached drawings.

BRIEF DESCRIPTION OF THE DRAWINGS

FIG. 9A illustrates an example of a screen for managing settings of a learning model in the malfunction prediction apparatus according to the exemplary embodiment.

FIG. 9B illustrates a screen for displaying a list of post-learning models for managing the post-learning models in the malfunction prediction apparatus according to the exemplary embodiment.

DESCRIPTION OF THE EMBODIMENTS

Figure 1:
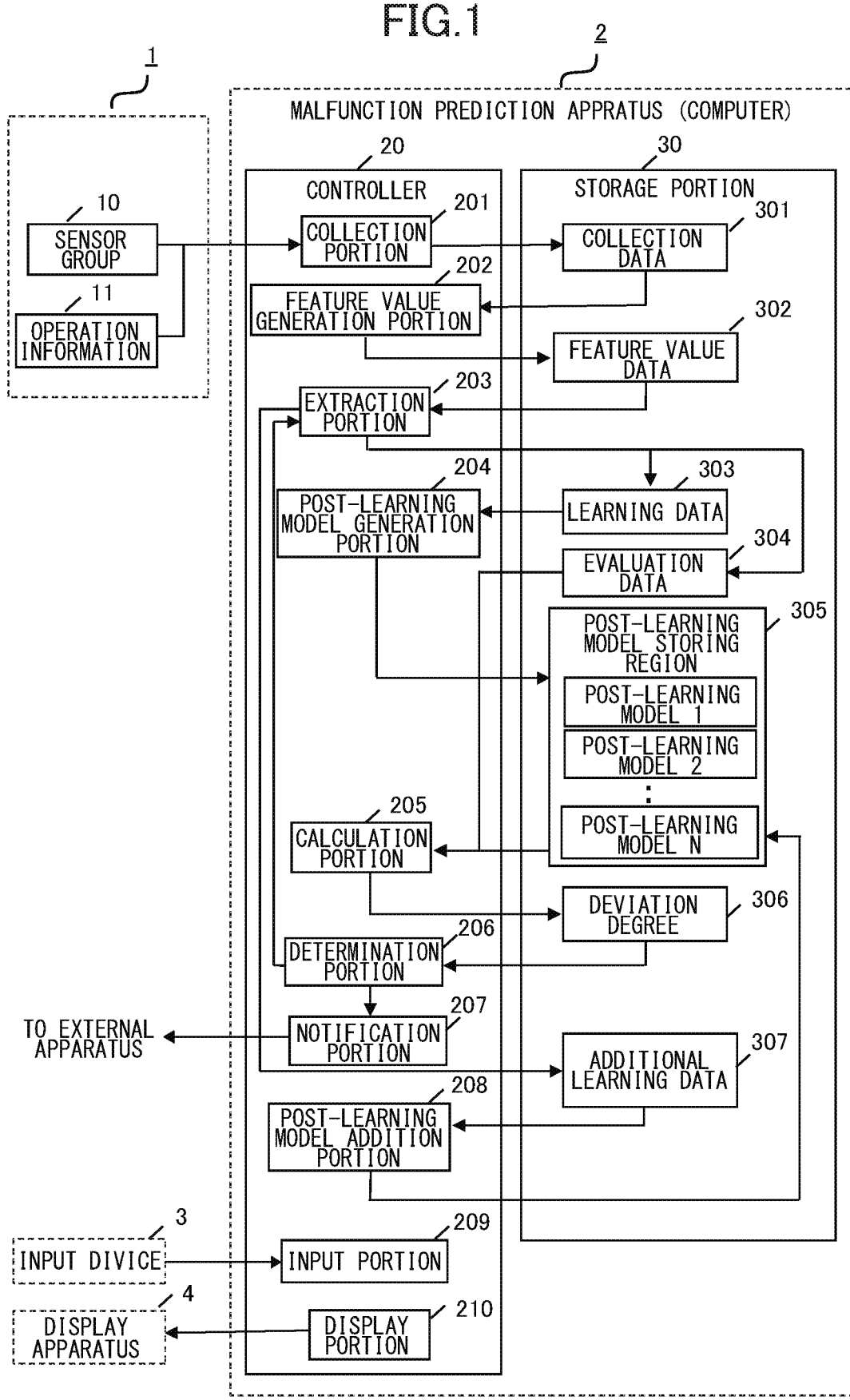
FIG. 1 is a functional block diagram illustrating functional blocks included in a malfunction prediction apparatus according to an exemplary embodiment.

An information processing method serving as a control method of a manufacturing machine or the like, and an information processing apparatus serving as a control apparatus that serve as an exemplary embodiment of the present invention will be described with reference to drawings.

To be noted, the "manufacturing machine or the like" used herein does not necessarily refer only to a machine, equipment, a manufacturing system, or the like related to manufacture of a product. The term refers to a machine, equipment, system, or the like which requires maintenance operation for use and various parameters indicating the state of which can be changed by the maintenance operation within the range of normal state. In the description of exemplary embodiment below, a control method and a control apparatus may be referred to as a malfunction prediction method, malfunction prediction determination, malfunction prediction apparatus, and the like for the sake of convenience.

To be noted, elements denoted by the same reference numerals in the drawings referred to in the description below have the same functions unless otherwise described.

Exemplary Embodiment

Configuration of Malfunction Prediction Apparatus

FIG. 1 is a schematic functional block diagram illustrating functional blocks included in a malfunction prediction apparatus according to the present exemplary embodiment. To be noted, whereas components required for describing a feature of the present exemplary embodiment are illustrated as functional block in FIG. 1, illustration of general components not directly related to the principal of problem solving of the present invention is omitted. In addition, each component illustrated in FIG. 1 is functionally conceptual, and is not necessarily physically configured as illustrated. For example, the specific mode of division and integration of the functional blocks is not limited to the illustrated example, and all or part thereof can be functionally or physically divided or integrated into arbitrary units in accordance with various loads, use conditions, and the like.

A malfunction prediction apparatus 2 includes a controller 20 and a storage portion 30, and each functional block is constituted by software of a computer or some kind of hardware. For example, among functional blocks included in the controller 20, a collection portion 201 to a post-learning model addition portion 208 are realized by a processor such as a central processing unit: CPU or a graphics processing unit: GPU executing a computer program stored in an auxiliary storage device and loaded onto a main storage device. In addition, the storage portion 30 is realized by a storage device such as a hard disk drive or a nonvolatile memory, and stores collection data 301, feature value data 302, learning data 303, evaluation data 304, learning models, deviation degree 306, additional learning data 307, and so forth.

Figure 12:
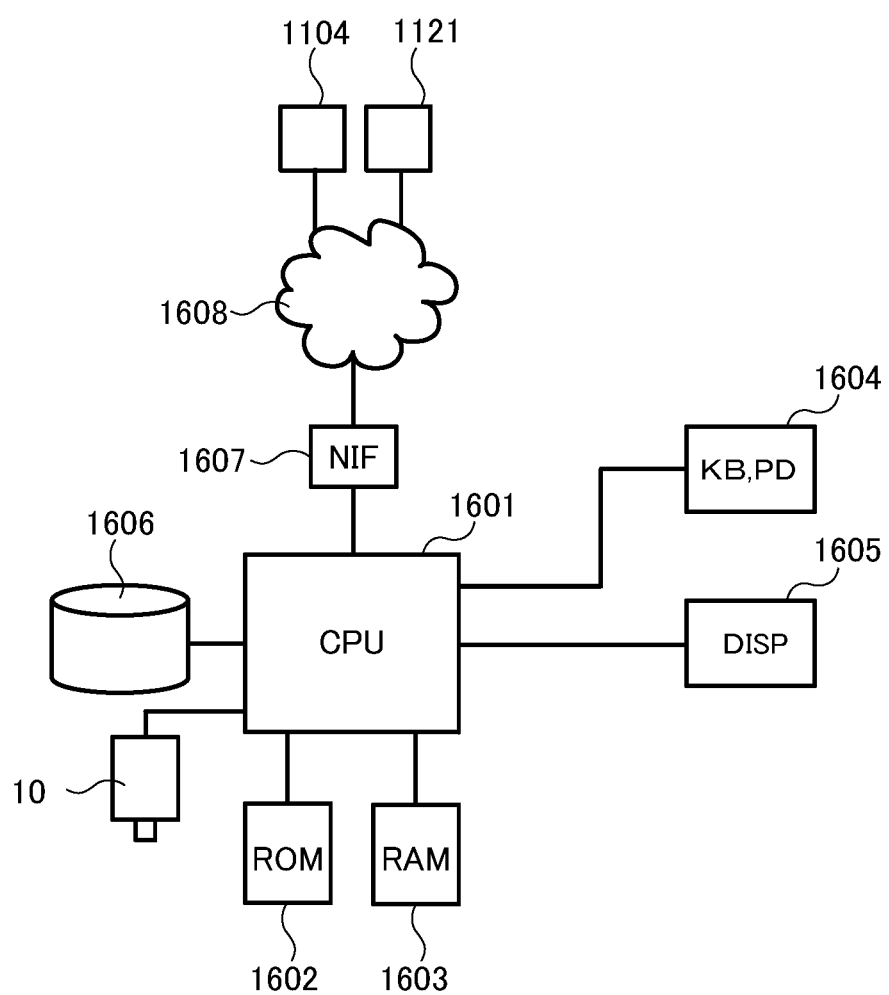
FIG. 12 is a schematic diagram illustrating an example of a hardware configuration of the malfunction prediction apparatus according to the exemplary embodiment.

FIG. 12 schematically illustrates an example of a hardware configuration of the malfunction prediction apparatus according to the present exemplary embodiment. As illustrated in FIG. 12, the malfunction prediction apparatus can include computer hardware including a CPU 1601 serving as a main controller, a read-only memory: ROM 1602 serving as a storage device, and a random-access memory: RAM 1603. The ROM 1602 can store information such as learning programs and inference algorithms for realizing a malfunction prediction method that will be described later. In addition, the RAM 1603 is used as a work area or the like for the CPU 1601 when executing a control procedure of the malfunction prediction method. In addition, an external storage device 1606 is connected to the control system. The external storage device 1606 is constituted by a hard disk drive: HDD, a solid-state device: SSD, or an external storage device of another system that is network-mounted.

A processing program for the CPU 1601 for realizing a control procedure of the present exemplary embodiment that will be described later can be stored in a storage portion such as the external storage device 1606 constituted by an HDD, an SSD, or the like, or, for example, an electrically erasable programmable ROM: EEPROM region of the ROM 1602. In this case, the processing program for the CPU 1601 for realizing the control procedure that will be described later can be supplied to each of the storage portions described above via a network interface: NIF 1607, and can be updated to a new, or different program. Alternatively, the processing program for the CPU 1601 for realizing the control procedure that will be described later can be supplied to each of the storage portions described above via storage media such as various magnetic disks, optical disks, and flash memories and drive devices therefor, and contents thereof can be updated. The various storage media, storage portions, and storage devices storing the control program for the CPU 1601 for realizing the control procedure described above each constitute a computer-readable recording medium storing a control procedure of the present invention.

The CPU 1601 is connected to a sensor group 10 illustrated in FIG. 1. Although the sensor group 10 is illustrated as being directly connected to the CPU 1601 in FIG. 12 for the simplicity of illustration, the sensor group 10 may be connected to the CPU 1601 via, for example, a so-called general-purpose interface bus: GPIB such as IEEE 488. In addition, the sensor group 10 may be connected to the CPU 1601 via the network interface 1607 and a network 1608.

The network interface 1607 can be configured by, for example, using a communication standard of wired communication such as IEEE 802.3 or a communication standard of wireless communication such as IEEE 802.11 or IEEE 802.15. The CPU 1601 can communicate with other apparatuses 1104 and 1121 via the network interface 1607. The apparatuses 1104 and 1121 may be for example, an integral control apparatus such as a programmable logic controller: PLC or a sequencer or a management server that are provided in a manufacturing line for manufacture control or management.

In the example illustrated in FIG. 12, an operation portion 1604 and a display apparatus 1605 corresponding to an input device 3 and a display apparatus 4 illustrated in FIG. 1 are connected to the CPU 1601 as user interface devices: UI devices. The operation portion 1604 can be constituted by a terminal such as a handy terminal, devices such as a keyboard, a jog dial, a mouse, a pointing device, and the like, or a control terminal including at least one of these. The display apparatus 1605 may be any display as long as the display apparatus 1605 can display information related to a learning model, evaluation data, and so forth that will be described later on a screen, and for example, a liquid crystal display apparatus can be used.

Referring back to FIG. 1, mechanical equipment 1 that is mechanical equipment serving as a subject of malfunction prediction determination is communicably connected to the malfunction prediction apparatus 2. Examples of the mechanical equipment 1 include an injection molding machine that heats and melts a plastic material, injects the melted plastic material into a mold cavity, and molds the injected material, but the mechanical equipment 1 is not limited to this.

Figure 10A:
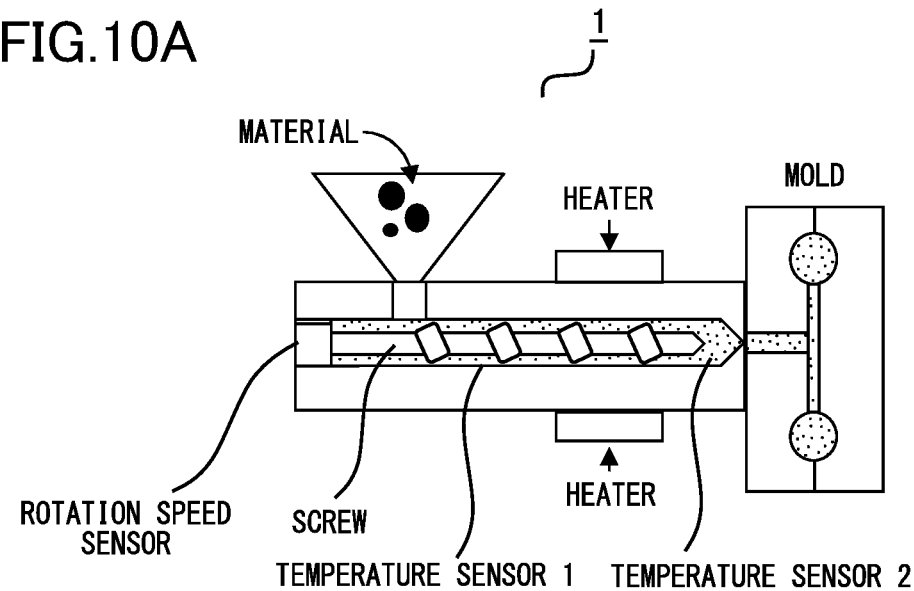
FIG. 10A is a diagram illustrating a simplified structure of an injection molding machine serving as an example of a subject machine.

FIG. 10A illustrates a simplified structure of the injection molding machine serving as an example of the mechanical equipment 1. The injection molding machine is a machine that, for example, heats and melts pellets of a plastic material, pressurizes the melted plastic material by a screw, and molds the plastic material by injecting the plastic material into a cavity defined by a mold. The injection molding machine is a complex apparatus constituted by many components, and if the injection molding machine is used for a long period, for example, the nature of the melted material can change and the melted material adhere to a part such as the screw. If the adhesion progresses, eventually an abnormal state, that is, a malfunction, in which a material of an appropriate amount cannot be injected into the cavity and a defective product is manufactured, can occur. There are also other factors that can cause the abnormal state, and a maintenance operation such as disassembling and cleaning the machine or replacing a part takes a long time. Therefore, the malfunction prediction apparatus of the present exemplary embodiment detects a sign and issues a notification before the injection molding machine reaches the abnormal state, that is, malfunction, such that a user can perform the maintenance operation at an appropriate timing.

Referring back to FIG. 1 again, the malfunction prediction apparatus 2 is configured to collect data from the sensor group 10 provided in the mechanical equipment 1 and operation information 11 from a controller of the mechanical equipment 1. The data collected from the sensor group 10 is measurement data related to various parameters indicating the state of the mechanical equipment 1 such as the temperature of each portion of the injection molding machine, the injection pressure of molten plastic material, the load, position, vibration, and sound of an actuator, and so forth. The load of the actuator is represented by a current value.

Operation of Functional Block

Next, functional blocks included in the malfunction prediction apparatus 2 will be described sequentially.

A collection portion 201 collects sensor data from the sensor group 10 of the mechanical equipment 1 at a predetermined periodicity, and stores the collected data in the storage portion 30 as collection data 301. Measurement data related to parameters useful as determination factors when detecting whether or not occurrence of abnormality, that is, malfunction, is close in the mechanical equipment 1.

Figure 2:
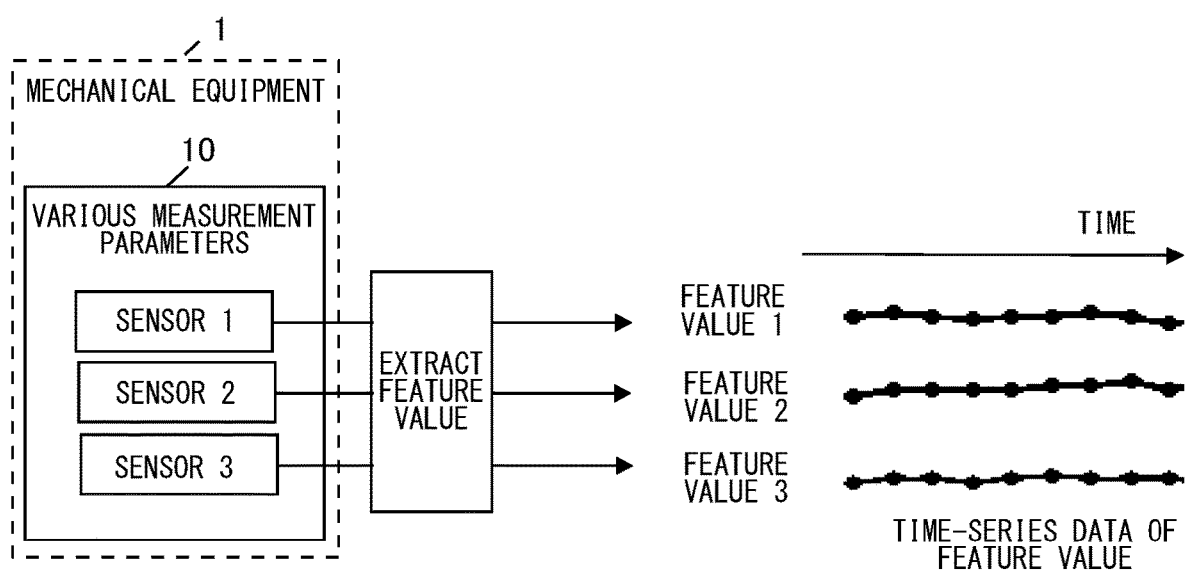
FIG. 2 is a diagram for describing extraction of a feature value.

A feature value generation portion 202 serving as a feature value extraction portion extracts or calculates a feature value representing a feature of the operation status of the mechanical equipment 1 by processing the collection data 301, and stores the feature value in the storage portion 30 as feature value data 302. For example, as feature value data, a maximum value and/or a minimum value of the measurement values of sensors collected in one operation cycle of the mechanical equipment 1 may be extracted, or an average value thereof may be calculated. Alternatively, for example, the feature value data may be obtained by performing integration conversion of values of the sensors in a predetermined period into a time-series frequency region. In addition, the feature value data may be differential values or secondary differential values of the sensor values arranged in time series with respect to time. In addition, in the case where the measurement values of the sensors themselves, that is, raw data, are sufficient as determination factors for detecting whether or not occurrence of abnormality is close, the measurement values themselves may be used as the feature value data 302. In the present exemplary embodiment, as illustrated in FIG. 2, the mechanical equipment 1 serving as a subject of malfunction prediction includes the sensor group 10 including sensors 1 to 3 for measuring various parameters for detecting the state of the machine. In the malfunction prediction method according to the present exemplary embodiment, feature values such as periodicity and relevance are extracted from the sensor data obtained from the sensor group 10. For example, the feature value generation portion 202 extracts or calculates the feature value on the basis of measurement data of the sensors 1 to 3, thus generates time-series feature values 1 to 3 corresponding to sampling timings of the sensors, and stores the feature values 1 to 3 as the feature value data 302 in the storage portion 30.

An extraction portion 203 extracts data of an arbitrary period from the feature value data 302 stored in the storage portion 30. In the present exemplary embodiment, a data set of a "normal period" is extracted from the feature value data 302, and stores the extracted data set in the storage portion 30 as learning data 303. Here, the "normal period" refers to a predetermined period which is set by selecting a period in which the mechanical equipment 1 is definitely in the normal state, such as an initial stage after the start of use of the mechanical equipment 1 or a period immediately after the maintenance. That is, the normal period is a predetermined period in which the occurrence of malfunction is not close yet. In the present exemplary embodiment, the "normal period" is the first three days of a period in which the mechanical equipment 1 is in the normal state. Here, the learning data 303 is a data set of the feature value data 302 generated from collection data of the first three days after the start of use of the mechanical equipment 1, that is, from collection data of the initial state.

In addition, when determining whether or not the occurrence of abnormality is close, the extraction portion 203 extracts a data set of a period serving as an evaluation target from the feature value data 302, and stores the extracted data set in the storage portion 30 as evaluation data 304.

In addition, in the case where the extraction portion 203 has received from a determination portion 206 an instruction to extract additional data, the extraction portion 203 extracts a data set of an additional period from the feature value data 302, and stores the extracted data set in the storage portion 30 as additional learning data 307.

A post-learning model generation portion 204 performs machine learning on the basis of the learning data 303 that is a data set of the feature value data 302 of the initial state of the mechanical equipment 1 after the start of use, and generates a post-learning model 1 as a first post-learning model. Then, the post-learning model generation portion 204 stores the post-learning model 1 in a post-learning model storing region 305 serving as a post-learning model storage portion.

A calculation portion 205 calculates a deviation degree 306 from the normal state of the mechanical equipment 1, on the basis of the evaluation data 304 and an output obtained by inputting the evaluation data 304 to a post-learning model stored in the post-learning model storing region 305. The calculation portion 205 is realized by applying the post-learning model stored in the post-learning model storing region 305 to a platform capable of executing inference processing by machine learning. The processing algorithm of the calculation portion 205 may be, for example, inference processing using a multilayer neural network, or learning algorithm publicly known as machine learning, such as a support vector machine or a gaussian mixture model. In the case where a plurality of post-learning models are stored in the post-learning model storing region 305, the calculation portion 205 individually calculates the deviation degree for each of the post-learning models.

A determination portion 206 refers to the deviation degree 306 calculated by the calculation portion 205 using each post-learning model, and in the case where all of calculated deviation degrees are equal to or greater than a determination threshold, determines that there is a sign of malfunction, and issues a notification request instruction to a notification portion 207.

To be noted, in the case where a new post-learning model needs to be additionally generated, the determination portion 206 instructs the extraction portion 203 to extract feature value data of an additional period as additional learning data 307.

In the case where the notification portion 207 has received from the determination portion 206 the notification request instruction based on the determination that there is a sign of malfunction, the notification portion 207 notifies an alert to an external apparatus such as a display portion. As a method of notification, for example, notification may be performed by lighting a lamp of the mechanical equipment, generating a warning sound, displaying a notification message on a display, or sending an e-mail. In addition, the notification may be displayed on the display apparatus 4 via a display portion 210.

In the case where the additional learning data 307 has been extracted, a post-learning model addition portion 208 generates a post-learning model 2 on the basis only of the additional learning data 307 by machine learning, and adds the post-learning model 2 to the post-learning model storing region 305. That is, similarly to the post-learning model generation portion 204 that has generated the post-learning model 1, the post-learning model addition portion 208 generates the post-learning model 2. After this, each time the additional learning data 307 is extracted, the post-learning model addition portion 208 generates a new post-learning model on the basis of the additional learning data by performing machine learning, and adds a post-learning model 3, a post-learning model 4, . . . to the post-learning model storing region 305.

An input portion 209 receives a user instruction input through the input device 3 such as a keyboard or a mouse, for example, a user instruction to select the feature value data 302 to be used for generation of a learning model, or a user instruction designating a period from which the learning data 303 is to be extracted.

The display apparatus 4 included in the malfunction prediction apparatus 2 is constituted by a display device such as a liquid crystal display as described above. To be noted, the display apparatus 4 may be an external apparatus connected to the malfunction prediction apparatus 2.

The display portion 210 processes data such as the collection data 301 to the additional learning data 307 stored in the storage portion 30 to make the data visually understandable for a user, and causes the display apparatus 4 such as a liquid crystal display to display the processed data. For example, the display portion 210 can process the data into a form of a chart in which data is plotted with respect to time or a form of a table and cause the display apparatus 4 to display the processed data.

Malfunction Prediction Method

Next, an operation of the malfunction prediction apparatus and a malfunction prediction method according to the present exemplary embodiment will be described with reference to a flowchart of FIG. 7.

After the use is started, first, in step S101, a controller 20 determines, on the basis of operation information 11 input from the mechanical equipment 1, whether or not this is the first time using the malfunction prediction apparatus 2 for the operation to be started by the mechanical equipment 1.

Here, in the case where the use is the first time, that is, in the case where the result of step S101 is Yes, the controller 20 sets a "normal period" in step S102. In step S102, a specific period like "three days from date xx/xx" is set as a first normal period for the first time of use.

Next, in step S103, the extraction portion 203 extracts feature value data of the normal period from the feature value data 302 as the learning data 303. Then, the post-learning model generation portion 204 generates the post-learning model 1 as a first post-learning model by a machine learning algorithm using the learning data 303.

Figure 7:
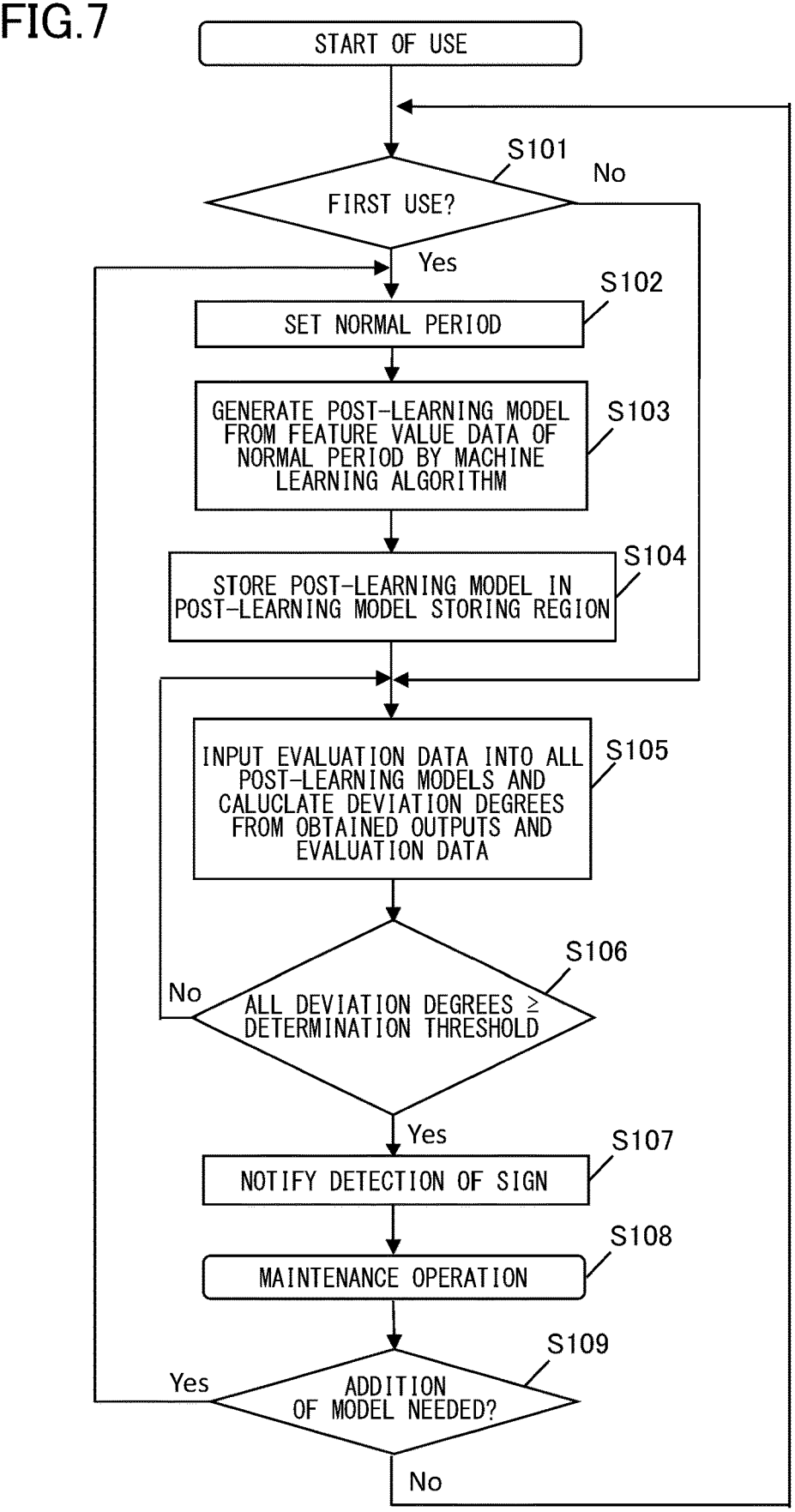
FIG. 7 is a flowchart illustrating the order of steps of a malfunction prediction method according to the exemplary embodiment.

Here, description of the flowchart of FIG. 7 is temporarily stopped, and a method of generating a post-learning model will be described.

Generation of Post-Learning Model

Machine learning of the present exemplary embodiment will be described by taking a three-layer neural network as an example. In the present exemplary embodiment, three pieces of successive time-series data of the feature values 1 to 3 illustrated in FIG. 2 are input, and thus a post-learning model that estimates and outputs the feature values 1 to 3 of the next timing is generated.

First, the data structure of the learning data 303 used for machine learning will be described. The extraction portion 203 extracts the feature value data of the normal period as the learning data 303, and the learning data 303 has a data structure including a plurality of pieces of learning data.

First, the time-series feature value data corresponding to sensor sampling timings as illustrated on the right side of FIG. 2, that is, the feature values 1 to 3 are prepared for the normal period. A plurality of pieces of learning data in which an input signal and teaching data are combined are generated on the basis of this time-series data.

Figure 3A:
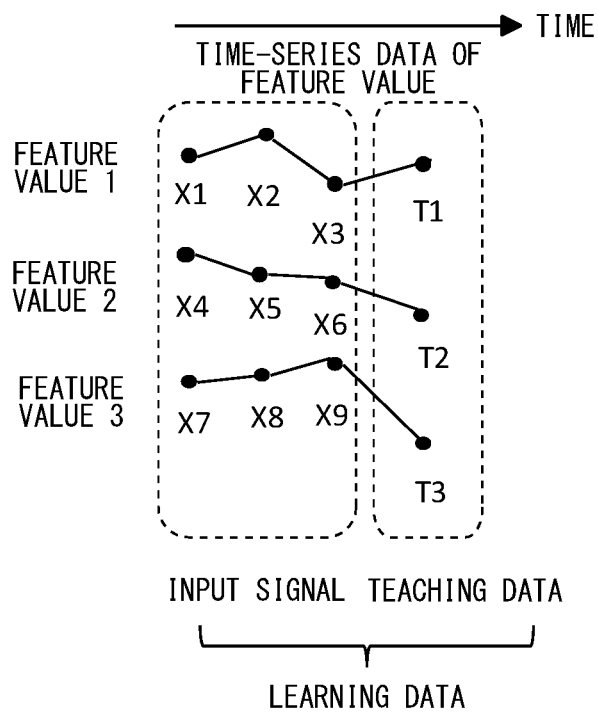
FIG. 3A is a diagram illustrating an example of learning data according to the exemplary embodiment.

FIG. 3A illustrates one piece of learning data as an example. Successive feature value data, that is, the feature values 1 to 3, corresponding to three times of sampling are extracted from the time-series feature value data, and prepared as input signals X1 to X9 for the neural network. In addition, T1, T2, and T3, which are feature value data corresponding to the sampling timing subsequent to X3, X6, and X9, are extracted and prepared as teaching data. A set of the input signals X1 to X9 and the teaching data T1 to T3 is set as one piece of learning data.

The plurality of pieces of learning data based on the feature value of the entirety of the "normal period" are prepared by generating each piece of learning data while changing the sampling timing of the input signals and teaching data by an increment of one time of sampling.

Figure 3B:
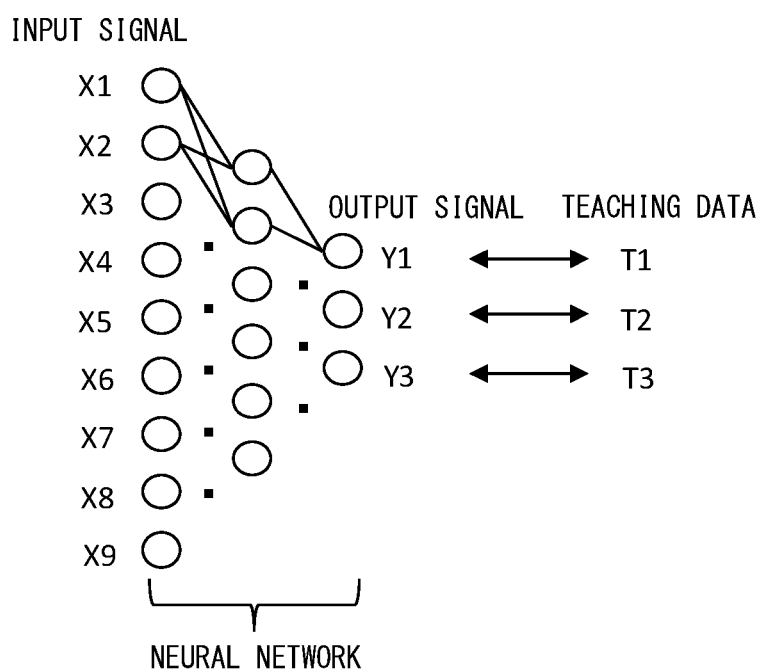
FIG. 3B is a diagram illustrating an example of machine learning according to the exemplary embodiment.

FIG. 3B illustrates an example of machine learning using one piece of learning data. A neural network learns weighting of an internal function so as to minimize a difference between output data Y and teaching data T. As the plurality of pieces of prepared learning data are sequentially added one by one to the neural network, the neural network updates the weighting of the internal function so as to minimize the difference between the output data Y and the teaching data T. A post-learning model is generated in the neural network by completing the update of the weighting using all the learning data corresponding to the "normal period".

As described above, the term "normal period" refers to a period in which the normal state is expected to continue for a long time, such as an initial stage after the start of use of the mechanical equipment 1 or a period immediately after the maintenance operation. Therefore, the post-learning model generated herein is a post-learning model capable of, when three pieces of feature value data successive in time series in a period in which the normal state is expected to continue for a long time are input, predicting and outputting the fourth feature value subsequent to the three pieces of the feature value data.

Referring back to the flowchart of FIG. 7, in step S104, the post-learning model 1 generated in step S103 is stored in the post-learning model storing region 305.

When the storing of the post-learning model 1 is completed in step S104, the process transitions to step S105. To be noted, in the case where it has been determined in step S101 that this is not the first time the malfunction prediction apparatus 2 is used, that is, in the case where the result of step S101 is No, generation of the post-learning model 1 has been already completed, therefore steps S102 to S104 are skipped, and the process transitions to step S105.

In step S105, the calculation portion 205 calculates the deviation degree 306, which is an indicator for determining whether or not occurrence of malfunction of the mechanical equipment 1 is close, in an evaluation period which is a time point for which the state of the mechanical equipment 1 is to be evaluated. The deviation degree 306 can be also referred to as an indicator indicating how much the state of the mechanical equipment 1 in the evaluation period is different from the initial stage of the normal state, that is, in the normal period.

Calculation of Deviation Degree

The extraction portion 203 extracts feature value data corresponding to a time point for which the state of the mechanical equipment 1 is desired to be evaluated, that is, the evaluation period, as the evaluation data 304 from the feature value data 302. For example, in the case where it is desired to evaluate the current state, the latest past feature value data is extracted.

Figure 4A:
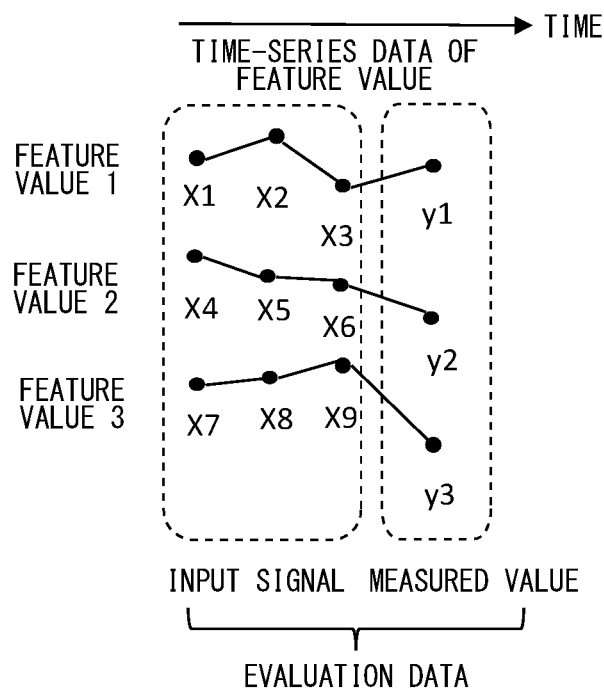
FIG. 4A is a diagram illustrating an example of evaluation data according to the exemplary embodiment.

FIG. 4A illustrates one piece of evaluation data as an example. Successive feature value data, that is, the feature values 1 to 3, corresponding to three times of sampling are extracted from the time-series feature value data, and prepared as input signals X1 to X9 for the post-learning model. In addition, feature value data y1, y2, and y3 corresponding to a sampling timing subsequent to that of X3, X6, and X9 are extracted from the time-series feature value data, and are prepared as measured values. A set of the input signals X1 to X9 and the measured values y1 to y3 is set as one piece of evaluation data. Although only one piece of evaluation data, which includes X1 to y1 corresponding to the feature value 1, X4 to y2 corresponding to the feature value 2, and X7 to y3 corresponding to the feature value 3, is illustrated in FIG. 4A, it is preferable to prepare a plurality of pieces of evaluation data by using input signals and measured values of different sampling timings.

Figure 4B:
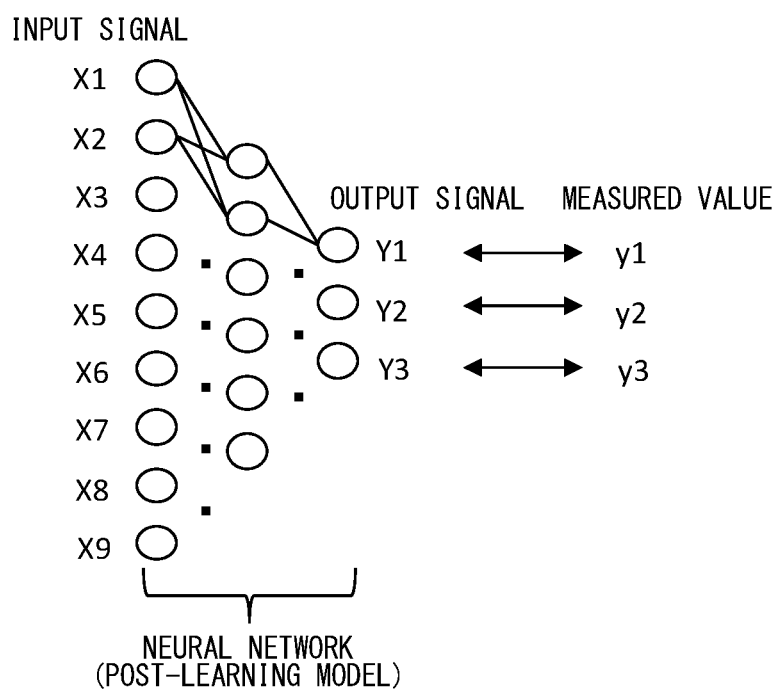
FIG. 4B is a diagram illustrating an example of calculation of a deviation degree according to the exemplary embodiment.

As illustrated in FIG. 4B, the malfunction prediction apparatus 2 inputs the input signals X1 to X9 included in the evaluation data into the post-learning model stored in the post-learning model storing region 305, and obtains output signals Y1, Y2, and Y3 from the post-learning model. That is, X1 to X3 of the feature value 1, X4 to X6 of the feature value 2, and X7 to X9 of the feature value 3 are input into the post-learning model, and the output signal Y1 corresponding to the feature value 1, the output signal Y2 corresponding to the feature value 2, and the output signal Y3 corresponding to the feature value 3 are output as regression values, that is, estimated values. This step is performed on all the post-learning models stored in the post-learning model storing region 305, and output signals are obtained from each post-learning model.

The calculation portion 205 calculates the deviation degree by using the output signals Y1, Y2, and Y3 output from the post-learning model, the measured values y1, y2, and y3 included in the evaluation data, and a formula shown in the lower side of FIG. 4B, and stores the calculated deviation degree in the storage portion 30 as a deviation degree 306. Since the deviation degree is individually calculated for output signals of each post-learning model, the deviation degree 306 stored in the storage portion 30 includes calculation results, that is, deviation degrees of a number equal to the number of post-learning models. The deviation degree calculated from the output signals Y1, Y2, and Y3 output from each post-learning model and the measurement values y1, y2, and y3 obtained from the mechanical equipment 1 that is operating serves as an indicator for determining how much the state of the mechanical equipment 1 has changed from the initial stage of the normal state, that is, the normal period.

Next, in step S106, the determination portion 206 determines whether or not all deviation degrees calculated in step S105 are equal to or greater than a predetermined determination threshold.

For example, the post-learning model 1 is a post-learning model having learned the feature value immediately after the start of use of the mechanical equipment 1, that is, at the first use, and therefore the deviation degree calculated by using the output signals thereof serves as an indicator for determining how much the state of the mechanical equipment 1 has changed from the start of use. In addition, the post-learning model 2 is a post-learning model having learned the feature value immediately after the first maintenance operation as will be described later, and therefore the deviation degree calculated by using the output signals thereof serves as an indicator for determining how much the state of the mechanical equipment 1 has changed from immediately after the first maintenance operation.

Figure 11:
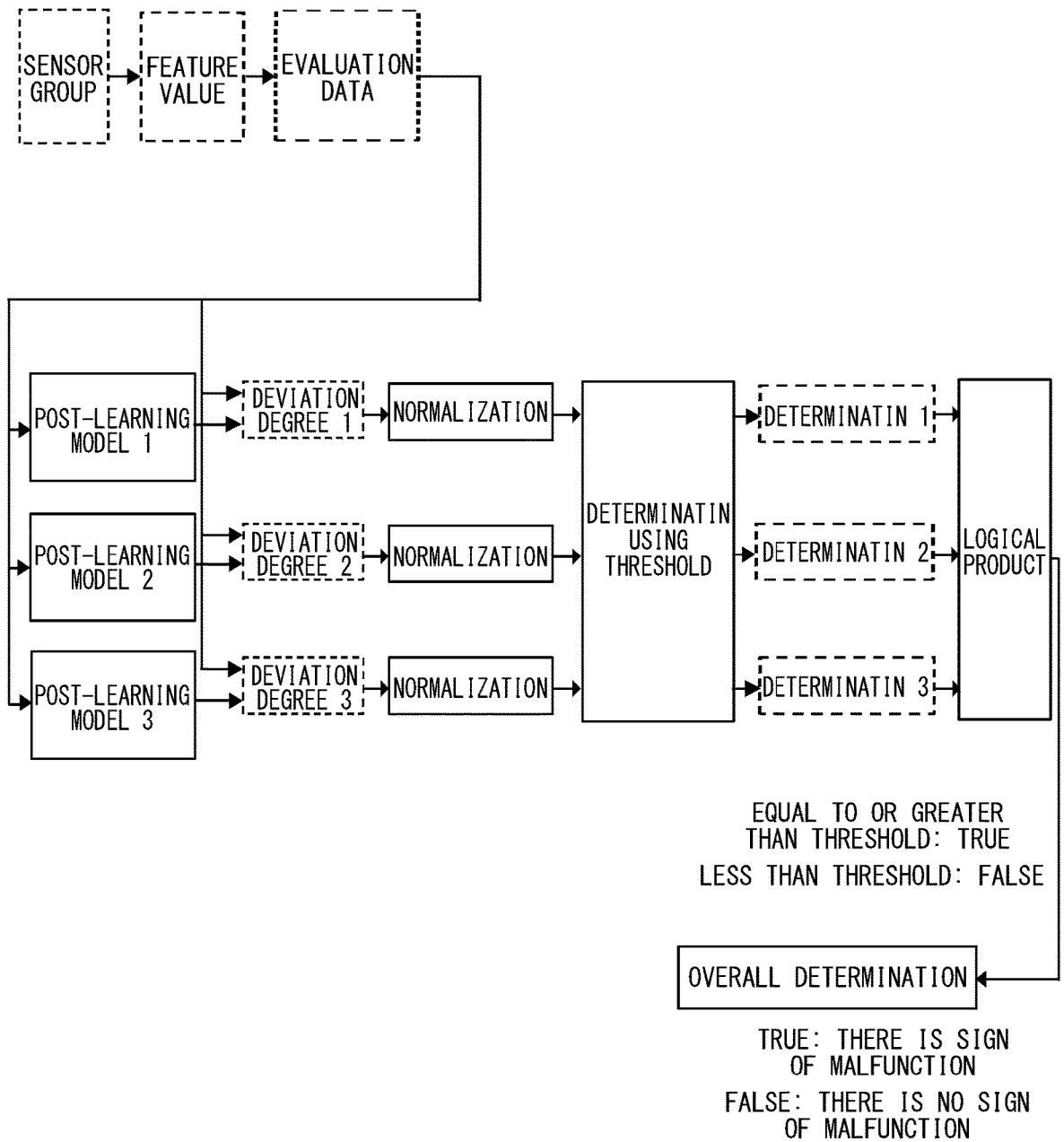
FIG. 11 is a diagram for describing a procedure for determining presence/absence of a sign of malfunction.

As illustrated in FIG. 11, in the case where all the deviation degrees calculated by using all the stored post-learning models are equal to or greater than the predetermined determination threshold, it is determined that there is a sign of malfunction. In contrast, in the case where at least one of the calculated deviation degrees is smaller than the determination threshold, it is determined that there is no sign of malfunction. To be noted, although a different determination threshold may be set for each of the calculated deviation degrees, determination can be made by using the same determination threshold by normalizing the calculated deviation degrees in advance as illustrated in FIG. 11. To be noted, FIG. 11 illustrates a logic in which a case where the normalized deviation degree is equal to or greater than the determination threshold is set as TRUE represented by 1, a case where the normalized deviation degree is smaller than the determination threshold is set as FALSE represented by 0, and it is determined that there is a sign of malfunction when the logical product is TRUE represented by 1. As a matter of course, a similar result can be also obtained from a logic in which a case where the normalized deviation degree is equal to or greater than the determination threshold is set as FALSE represented by 0, a case where the normalized deviation degree is smaller than the determination threshold is set as TRUE represented by 1, and it is determined that there is a sign of malfunction when the logical sum is FALSE represented by 0.

In the case where it has been determined in step S106 that there is no sign of malfunction, that is, in the case where the result of step S106 is No, the process returns to step S105, and monitoring for the sign of malfunction is continued.

In contrast, in the case where it has been determined in step S106 that there is a sign of malfunction, that is, in the case where the result of step S106 is Yes, the process transitions to step S107, and the notification portion 207 transmits an alert notification to an external apparatus. As a method of notification, an appropriate mode such as lighting a lamp of the mechanical equipment, generating a warning sound, displaying a notification message on the display apparatus 4 such as a display, or sending an e-mail can be employed.

A user that has received the alert notification indicating that there is a sign of malfunction in step S107 performs the maintenance operation in step S108. Information related to the maintenance operation may be collected from the mechanical equipment 1 as the operation information 11 by the malfunction prediction apparatus 2, or input to the malfunction prediction apparatus 2 by the user via the input device 3.

After the maintenance operation is performed in step S108, in step S109, the controller 20 determines whether or not to additionally generate a new post-learning model based on data measured by the sensor group 10 after this maintenance operation and store the new post-learning model in the post-learning model storing region 305. An event that can evoke the necessity to additionally generate a new post-learning model, such as the maintenance operation, can be also referred to as a trigger event.

In the case of additionally generating a new post-learning model, that is, in the case where the result of step S109 is Yes, the process returns to step S102, a predetermined period after this maintenance operation is newly set as the normal period, and processing of steps S102 to S104 is performed. That is, a new post-learning model is additionally generated and stored in the post-learning model storing region 305. Specifically, the extraction portion 203 extracts data of the normal period after this maintenance operation from the feature value data 302, and stores the extracted data as the additional learning data 307. The post-learning model addition portion 208 generates a post-learning model on the basis of the additional learning data 307, and stores the generated post-learning model in the post-learning model storing region 305. Then, the process transitions to step S105, and the sign of malfunction is monitored by using all the post-learning models including the added post-learning model.

In the case of not additionally generating a new post-learning model, that is, in the case where the result of step S109 is No, the process returns to step S105 via No of step S101, and the sign of malfunction is monitored.

The processing flow described above will be described in more detail.

Figure 5:
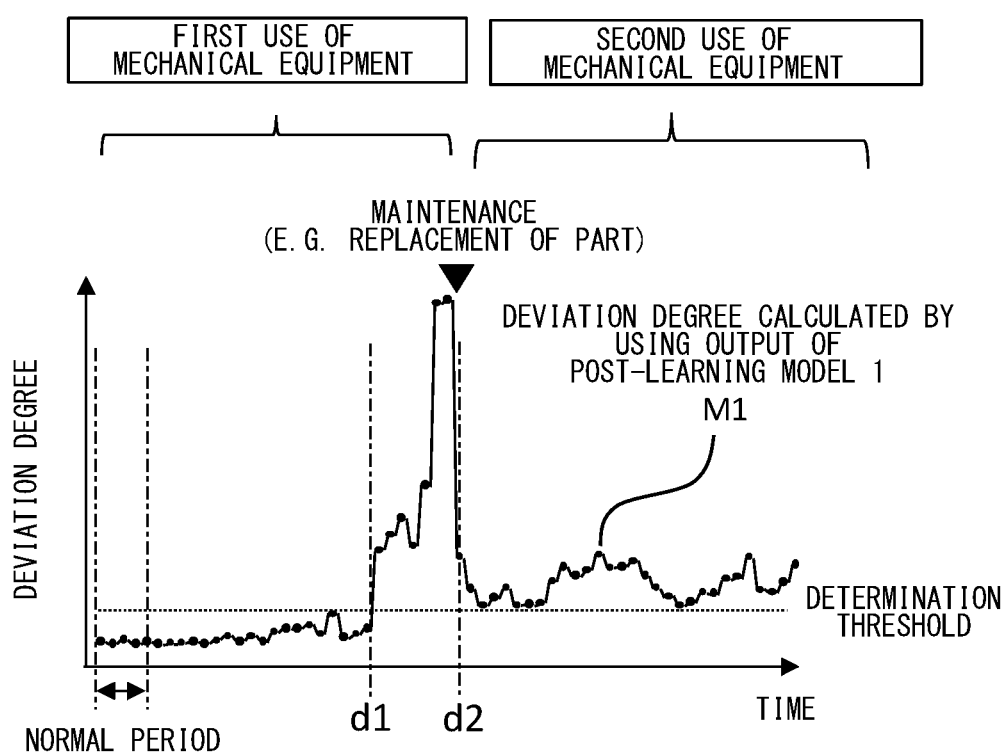
FIG. 5 is a diagram illustrating an example of a graph representing the deviation degree plotted with respect to time.

FIG. 5 is a graph showing the deviation degree with respect to time. The deviation degree is obtained from the output of the post-learning model 1 and measured values by using the post-learning model 1 generated by learning the data of the "normal period" of the first time of use. In the example of FIG. 5, the deviation degree exceeds the determination threshold of malfunction prediction at a time d1 after the start of use of the mechanical equipment or the like, and therefore it is determined in this time point that there is a sign of malfunction.

When a maintenance operator of the mechanical equipment receives a notification that there is a sign of malfunction, the maintenance operator performs a maintenance operation on the mechanical equipment at a timing when the maintenance operation can be performed. The maintenance operation is performed at a time point where "MAINTENANCE" is described in FIG. 5. Although the state of the mechanical equipment is improved by the maintenance operation, the measured values of the feature values change from those of the normal period of the first time of use due to replacement of parts or the like, and therefore the deviation degree calculated after the maintenance operation does not necessarily returns to the same level as that of the normal period of the first time of use. In the example of FIG. 5, at a time point d2, the value of the deviation degree is reduced as compared with before the maintenance, but is still larger than the determination threshold, and therefore it is erroneously determined that there is a sign of malfunction even though the mechanical equipment is in a good state immediately after the maintenance operation.

Therefore, in the present exemplary embodiment, the new post-learning model 2 is generated by machine learning using feature values measured in the initial stage of normal state after the maintenance operation as learning data, and the post-learning model 1 that has been already generated and the post-learning model 2 are used in combination for malfunction prediction.

A mode of newly generating and adding the post-learning model 2 after the maintenance operation and detecting the sign of malfunction by using the post-learning model 1 and the post-learning model 2 in combination will be described with reference to FIG. 6.

Figure 6:
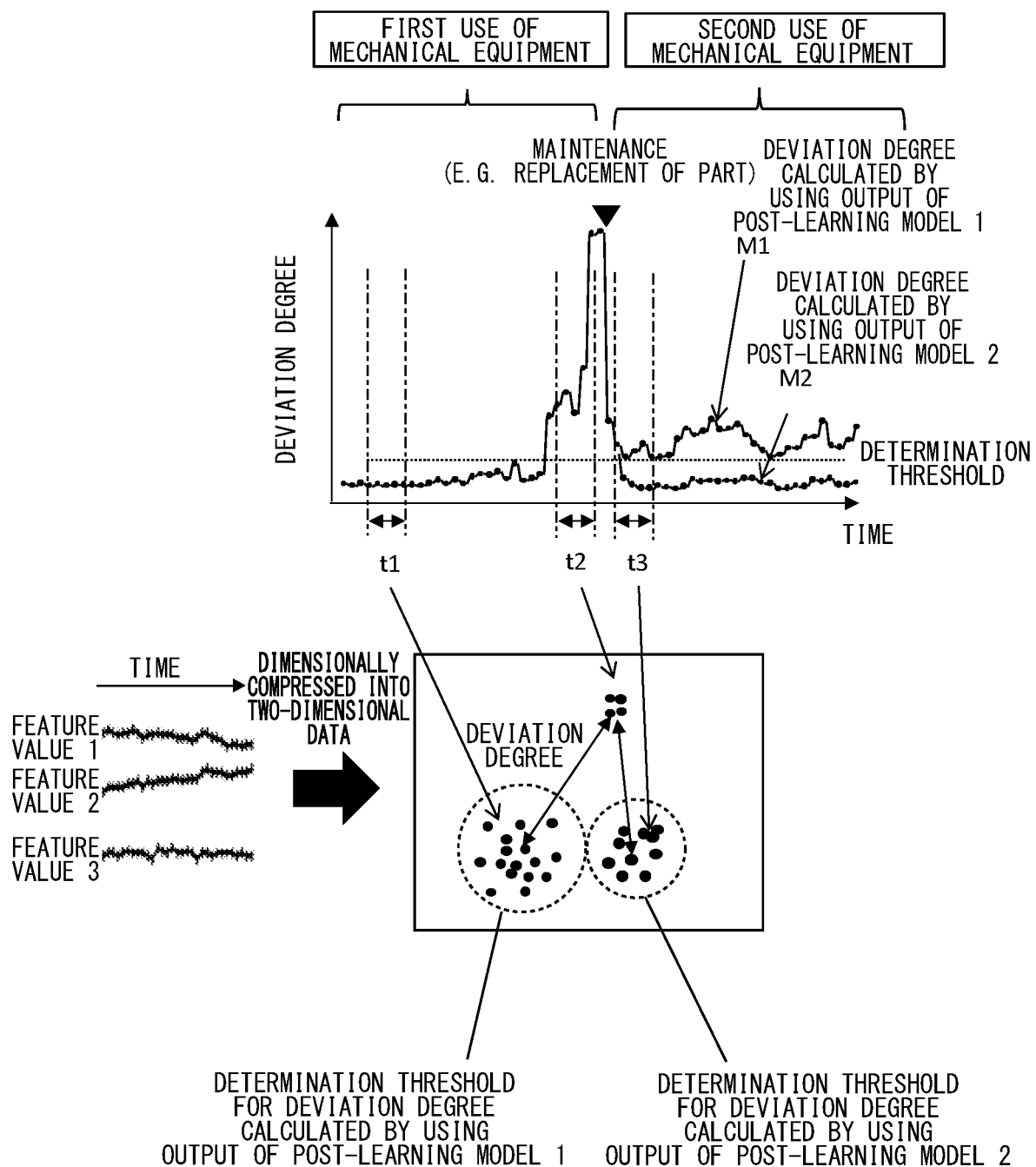
FIG. 6 is a diagram for describing a mode for detecting a sign of malfunction by using a first learning model and a second learning model in combination.

An upper part of FIG. 6 illustrates a graph showing temporal change of deviation degrees obtained from outputs of respective post-learning models and measured values. That is, a deviation degree M1 calculated by using the output of the post-learning model 1 and a deviation degree M2 calculated by using the output of the post-learning model 2 are plotted with respect to the time. However, in the case of calculating deviation degrees by using outputs of different post-learning models as in the present exemplary embodiment, the calculated deviation degrees vary depending on the learning data used for learning respective models, and therefore deviation degrees based on different post-learning models cannot be simply compared. Therefore, in FIG. 6, the deviation degrees are normalized such that the maximum values thereof are equal when learning data is given to the post-learning models as evaluation data.

A lower part of FIG. 6 illustrates a diagram in which a distribution of data is conceptually visualized by dimensionally compressing multi-dimensional data of the feature values 1 to 3 into two-dimensional data for a normal period t1 of the initial stage after the start of operation, a period t2 immediately before the malfunction, and a normal period t3 of the initial stage after the maintenance operation. As a method of compression into two-dimensional data, main component analysis or the like can be used, and the vertical axis and horizontal axis of the two-dimensional data respectively represent a first main component and a second main component. Pieces of data close in the two-dimensional space can be determined to have close tendencies in terms of the data of the feature values 1 to 3. To be noted, determination thresholds for the calculated deviation degrees are illustrated as circles in the diagram of the two-dimensional data, and the magnitude of the deviation degrees is expressed by the distance from the centers of the circles of the determination thresholds. However, these are not strict expressions, and are used conceptually for the sake of convenience.

The data of the normal period t1 is distributed in a region indicated by "DETERMINATION THRESHOLD FOR DEVIATION DEGREE CALCULATED BY USING OUTPUT OF POST-LEARNING MODEL 1" of FIG. 6. The data of the normal period t3 is distributed in a region indicated by "DETERMINATION THRESHOLD FOR DEVIATION DEGREE CALCULATED BY USING OUTPUT OF POST-LEARNING MODEL 2" of FIG. 6. As described above, after the maintenance operation, the operation status can change and thus the range of data distribution can change due to replacement of parts or the like even though the apparatus is in a normal state.

The post-learning model 1 generated by machine learning of feature values extracted from the data of the sensor group of the normal period t1 of the initial stage of the operation is a post-learning model that determines that a state within the data distribution range of the normal period t1 is a normal state in which there is no sign of malfunction. In the period t2 which is immediately before the malfunction of the apparatus and in which notification that there is a sign of malfunction should be issued, the deviation degree calculated by using the output of the post-learning model 1 is distributed in a region exceeding the determination threshold, and therefore it is determined that there is a sign of malfunction.

Although the user performs the maintenance operation such as replacement of parts at the time point where "MAINTENANCE" is described in FIG. 6, the state of the mechanical equipment does not return to the same state as that of t1 of the first time of use as described above. Therefore, the deviation degree M1 calculated by using the output of the post-learning model 1 obtained by inputting the measured feature values exceeds the determination threshold even though the apparatus is in a good state immediately after the maintenance operation.

However, the post-learning model 2 generated by machine learning of feature values of t3, which is a normal period immediately after the maintenance operation, is a post-learning model that determines that a state within the data distribution range of the normal period t3 is a normal state in which there is no sign of malfunction. Therefore, the deviation degree M2 calculated by using the output of the post-learning model 2 obtained by inputting the feature values measured immediately after the maintenance operation does not exceed the determination threshold.

Therefore, in the present exemplary embodiment, it is determined that there is no sign of malfunction until all the calculated deviation degrees become equal to or greater than the determination thresholds. In this case, it is determined that there is no sign of malfunction until the deviation degree M1 calculated by using the output of the post-learning model 1 and the deviation degree M2 calculated by using the output of the post-learning model 2 both become equal to or greater than the determination thresholds.

In the case where post-learning models are individually generated by respectively using the feature values of the normal period t1 and the normal period t3 as in the present exemplary embodiment, the determination values can be easily set near the respective distribution regions of the feature values as illustrated in FIG. 6, and therefore the precision of determination of the sign of malfunction can be increased.

A case where a new post-learning model is additionally generated after the maintenance operation has been described herein, and information related to the maintenance operation may be collected as the operation information 11 from the mechanical equipment 1 by the malfunction prediction apparatus 2, or may be input into the malfunction prediction apparatus 2 via the input device 3 by the user.

To be noted, as can be seen from the fact that step S109 is provided in the flowchart of FIG. 7, a new post-learning model does not have to be added every time the maintenance operation is performed. For example, in the case where the number of parts to be replaced in the maintenance operation is limited, there is a possibility that determination of a sign of malfunction can be made with high precision without additionally generating a post-learning model after additionally generating the limited number of post-learning models.

Figure 10B:
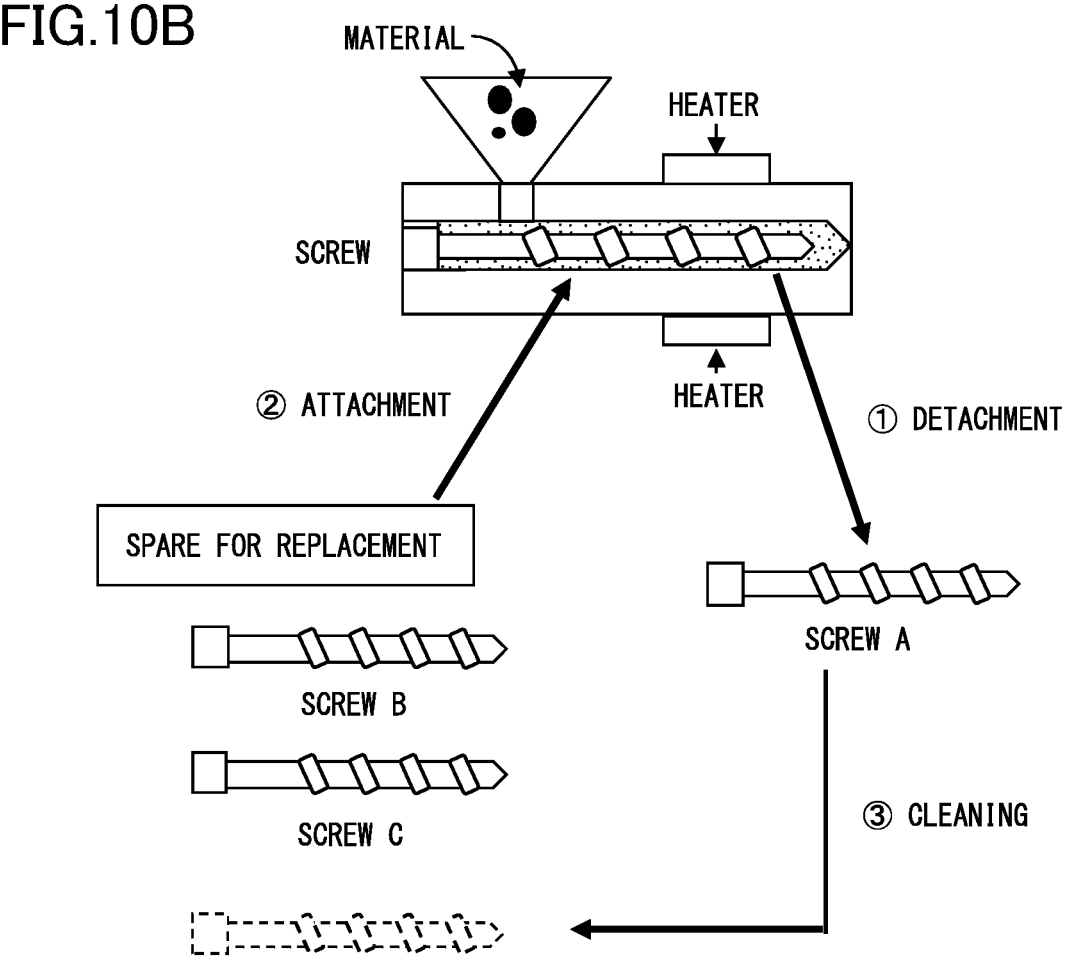
FIG. 10B is a diagram illustrating an example of replacement of a part in maintenance operation of the injection molding machine serving as an example of a subject machine.

For example, FIG. 10B illustrates an example of replacement of a part in the maintenance operation of an injection molding machine. In the maintenance operation of the injection molding machine, to minimize the time of stoppage of operation, a part is replaced by a spare part, and the detached part is cleaned thereafter. In the example of FIG. 10B, three screws are prepared, and these are exchanged in turn in each maintenance operation. It is assumed that the three screws have different characteristics within the range of predetermined standards, and all return to their original states after the cleaning operation. Although a post-learning model is added each time the screw is replaced in the maintenance operation, it becomes unnecessary to additionally generate a post-learning model in the rotation of the screws in the maintenance operation after three post-learning models corresponding to the three screws are generated. That is, the rotation of the screws in subsequent maintenance operations is not a trigger event that evokes the necessity of additionally generating a new post-learning model.

Next, a preferable method of providing information to a user in the malfunction prediction apparatus serving as a control apparatus and the malfunction prediction method serving as a control method of the present exemplary embodiment will be described.

Figure 8:
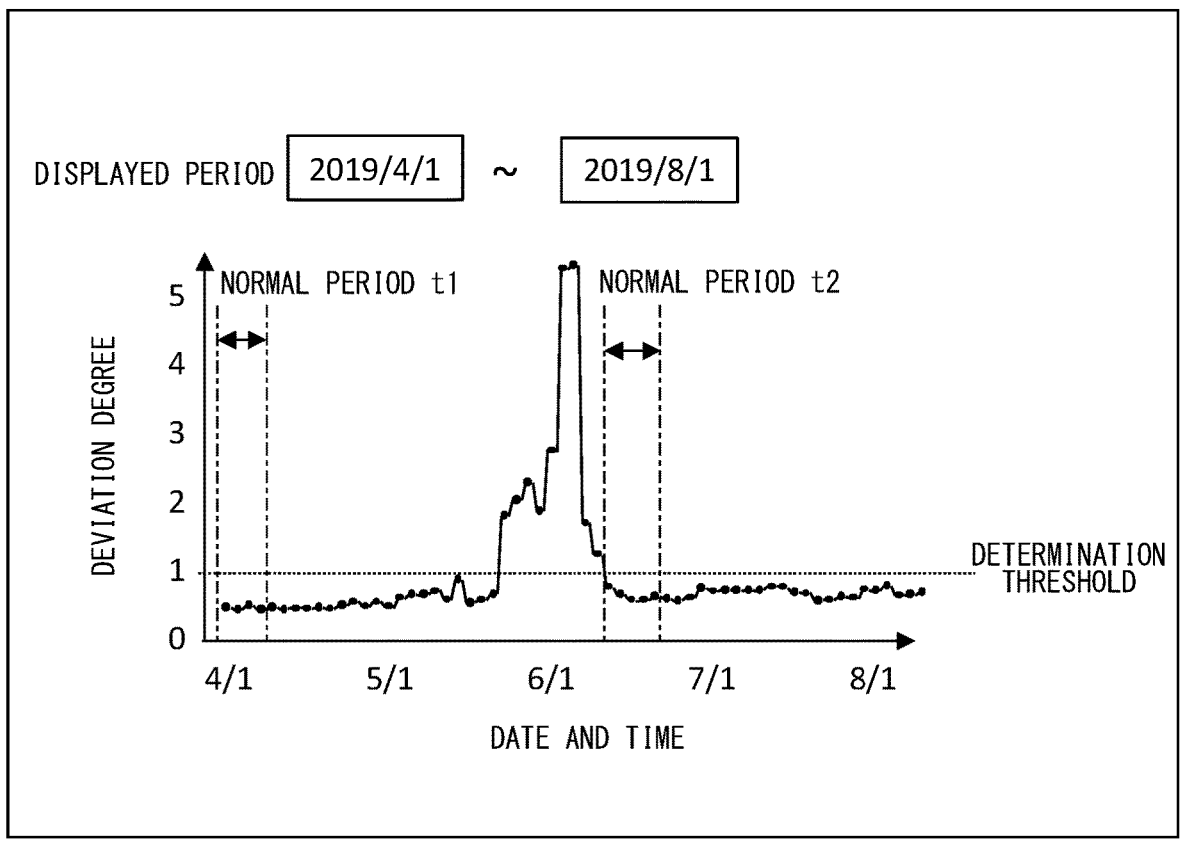
FIG. 8 is an example of an image displayed in the malfunction prediction apparatus according to the exemplary embodiment.

FIGS. 8, 9A, and 9B illustrate examples of images displayed on the screen of the display apparatus 4 by the display portion 210. By appropriately visualizing a part of the process of malfunction prediction, the user can instinctively grasp the control status.

FIG. 8 illustrates an example of a display screen suitably used when, for example, the user desires to recognize the deviation degree to grasp the state of the mechanical equipment 1. When the user designates a period whose deviation degree the user wants to display via the input device 3, the display portion 210 outputs display screen information to the display apparatus 4 to display the image illustrated in FIG. 8. In the display image, a display period field indicating the period designated by the user and a chart having a horizontal axis representing the date and time and a vertical axis representing the deviation degree are arranged.

By displaying such a chart, the user can easily grasp how much the operation status of the mechanical equipment 1 is deviated from the normal state and the temporal change thereof. In addition, if the value of deviation degree at which the malfunction of the mechanical equipment occurs is roughly known on the basis of past cases, the period until malfunction can be estimated by looking at this chart. In addition, what causes the malfunction can be inferred on the basis of the speed of change of the state. For example, it is known that the deviation degree increases quickly in the case of an event such as a mechanical crack in a part, and the deviation degree increases gradually in the case of an event such as wear or dirtiness of a part in which change occurs in accordance with the elapse of time. By evaluating how the deviation degree changes, the cause of the malfunction that will occur next can be narrowed down to some extent.

FIG. 9A illustrates a screen for managing the settings of a learning model, and is an example of a display screen that is suitably used in steps S102 to S104 of FIG. 7, that is, in each step for generating a post-learning model. In the screen, a field for inputting the name of the model as information for distinguishing the post-learning model to be generated from other post-learning models can be displayed. In addition, a feature value selecting field for selecting a feature value to be used for the learning model can be displayed, and a feature value to be used can be arbitrarily selected by the user selecting a button displayed as "USE" or "NOT USE" by using a pointing device or the like. In addition, by inputting specific date and time in a normal period field, the range of learning data to be used for machine learning can be set.

By employing such a screen configuration, the user can easily generate a post-learning model having high detection precision for the sign for each malfunction pattern even in the case where, for example, the feature value with which the sign can be easily detected differs for each pattern of occurrence of malfunction.

FIG. 9B illustrates a screen for managing post-learning models displayed in a list, and is an example of a display screen including icons suitably used for the user to newly add or delete a post-learning model. In the initial stage of the use, when the user selects an "ADD NEW MODEL" button of FIG. 9B, the learning model setting screen of FIG. 9A is displayed and the operation of adding a post-learning model can be started. In addition, in the case where, for example, a post-learning model is erroneously added, the user can delete the post-learning model by selecting a "DELETE" button of FIG. 9B by a pointing device or the like. In the present exemplary embodiment, even in the case where a post-learning model is additionally generated by machine learning by an error, no re-learning is necessary as long as the unrequired post-learning model is deleted, and therefore this screen is practically useful for the user.

As described above, in the present exemplary embodiment, it is determined that the normal state of the mechanical equipment 1 will not continue for a long time in the case where the mode of change of the feature value to be evaluated is deviated from modes of change of the feature value predicted by all the post-learning models beyond a predetermined range. In other words, in the case where the deviation degrees of the output of all the post-learning models from the measured feature value are equal to or greater than a predetermined determination threshold, it is predicted that the occurrence of malfunction of the mechanical equipment 1 is close, and it is determined that the maintenance operation should be performed.

By adding a learning model in accordance with the change in the operation status of the apparatus as in the present exemplary embodiment, malfunction prediction can be performed with high precision even in the case where it is difficult to collect data representing all the normal states in advance. In addition, since normal data learned by one model of machine learning is limited to one operation status of the apparatus, the complexity of data input in the model of machine learning does not change. Therefore, an event such as decrease in the detection precision caused by insufficient adjustment of parameters of the model of machine learning is not likely to occur. That is, a sign of malfunction can be detected with high precision without excessively increasing the operation load on the system.

To be noted, the present invention is not limited to the exemplary embodiment or example described above and can be modified in many ways within the technical concept of the present invention.

The mechanical equipment that can be a subject of malfunction prediction is not limited to the injection molding machine, and malfunction prediction can be performed for various mechanical equipment for which replacement or cleaning of mechanical part is performed in maintenance operation, such as injection machines for powder and liquid.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-175931, filed Sep. 26, 2019, which is hereby incorporated by reference herein in its entirety.

What is claimed is:

1. An information processing method for a controller to determine a state of mechanical equipment, the information processing method comprising:
    a measured value acquisition step of acquiring measured values measured by a sensor provided in the mechanical equipment;
    a first model acquisition step of the controller acquiring a first model by machine learning using the acquired measured values that are measured in a first period;
    a second model acquisition step of the controller acquiring a second model by machine learning using the acquired measured values that are measured in a second period after an occurrence of a trigger event in the mechanical equipment; and
    a determination step of the controller determining a state of the mechanical equipment by using the first model, the second model, and the acquired measured values that are measured when the controller determines the state of the mechanical equipment,
    wherein, in the second model acquisition step, the trigger event is a replacement of a part installed in the mechanical equipment, and the controller acquires the second model by machine learning using the acquired measured values that are measured in a period after the replacement of the part, the second model being different from the first model.

2. The information processing method according to claim 1, further comprising
    an extraction step in which the controller extracts a feature value from measurement values of the sensor that are obtained in time series,
    wherein, in the first model acquisition step, the controller acquires the first model by machine learning using the feature value extracted from the measurement values measured in the first period, and
    wherein, in the second model acquisition step, the controller acquires the second model by machine learning using the feature value extracted from the measurement values measured in the second period.

3. The information processing method according to claim 2, wherein, in the determination step, the controller inputs the feature value extracted from the measurement values measured in an evaluation period into all models, and determines the state of the mechanical equipment by using output signals output from the respective models.

4. The information processing method according to claim 3, wherein in the determination step,
    the controller calculates deviation degrees of the output signals from a measured value measured in the evaluation period, and
    the controller determines whether or not all the calculated deviation degrees are equal to or greater than a predetermined determination threshold.

5. The information processing method according to claim 4, wherein, in the determination step, the controller determines that there is a sign of malfunction of the mechanical equipment in a case where all the calculated deviation degrees are equal to or greater than the predetermined determination threshold.

6. The information processing method according to claim 4, further comprising a deviation degree displaying step in which the controller displays the deviation degrees on a display apparatus in time series.

7. The information processing method according to claim 1,
    wherein the mechanical equipment is an injection molding machine comprising a screw,
    wherein the sensor is a sensor configured to measure at least one of a current, position, vibration, and sound of an actuator that drives the screw, and
    wherein the controller:
    inputs, into a predetermined function, feature values of measurement values of the sensor respectively corresponding to a predetermined number of timings successive in time series,
    obtains an estimated feature value corresponding to a timing subsequent to the timings, the estimated feature value being estimated by using the predetermined function,
    obtains a measured feature value of a measurement value actually measured by the sensor at the subsequent timing, and
    generates the first model or the second model by repetitively updating the predetermined function such that a difference between the estimated feature value and the measured feature value becomes smaller.

8. The information processing method according to claim 1, wherein a predetermined period after start of use of the mechanical equipment is set as the first period.

9. The information processing method according to claim 1, wherein a predetermined period after start of use of the mechanical equipment after the trigger event is set as the second period.

10. The information processing method according to claim 1, wherein the replacement of the part installed in the mechanical equipment is a maintenance operation performed on the mechanical equipment.

11. The information processing method according to claim 1, further comprising a notification step in which a determination result of the determination step is notified to a user.

12. The information processing method according to claim 11, wherein, in the notification step, the determination result is notified to the user by at least one of displaying a notification on a display apparatus, lightning a lamp of the mechanical equipment, generating a warning sound, and sending an e-mail.

13. The information processing method according to claim 1, further comprising an information displaying step in which the controller displays information of at least one of the measured value acquisition step, the first model acquisition step, the second model acquisition step, and the determination step on a display apparatus.

14. The information processing method according to claim 13, further comprising a model information displaying step in which, in a case where the trigger event has occurred, the controller displays information of the first model and the second model and/or an icon for instructing newly adding a model on the display apparatus.

15. The information processing method according to claim 14, wherein, in the model information displaying step, the controller displays, on the display apparatus, information related to selection of feature value, information related to designation of the first period or the second period, and/or information distinguishing the second model from other models.

16. A non-transitory computer-readable recording medium storing a control program that enables executing the information processing method according to claim 1.

17. The information processing method according to claim 1, wherein, in the first model acquisition step, the controller controls a storage portion to store the first model, and wherein, in the second model acquisition step, the controller controls the storage portion to additionally store the second model.

18. An information processing apparatus including a controller, wherein the controller is configured to:
    acquire measured values measured by a sensor provided in the mechanical equipment,
    acquire a first model by machine learning using the acquired measured values that are measured in a first period,
    acquire a second model by machine learning using the acquired measured values that are measured in a second period after an occurrence of a trigger event in the mechanical equipment, and
    determine a state of the mechanical equipment by using the first model, the second model, and the acquired measured values that are measured when the controller determines the state of the mechanical equipment, and
    wherein the trigger event is replacement of a part installed in the mechanical equipment, and the controller is configured to acquire the second model by machine learning using the acquired measured values measured in a period after the replacement of the part, the second model being different from the first model.

19. The information processing apparatus according to claim 18, wherein the controller notifies a result of determination of the state of the mechanical equipment to a user.

20. The information processing apparatus according to claim 18, further comprising a display apparatus,
    wherein, when the controller executes at least one of a process of acquiring a measurement value of the sensor, a process of acquiring the first model, a process of acquiring a second model, and a process of determining the state of the mechanical equipment, the controller displays information of the at least one process on the display apparatus.

21. The information processing apparatus according to claim 20, wherein, in a case where the trigger event has occurred, the controller displays information of a first model and the second model and/or an icon for instructing newly adding a model on the display apparatus.

22. The information processing apparatus according to claim 21, wherein the controller displays, on the display apparatus, information related to selection of feature value, information related to designation of the first period and the second period, and/or information distinguishing the second model from other models.

23. The information processing apparatus according to claim 18, further comprising a display apparatus,
    wherein the controller extracts a feature value from measurement values of the sensor measured in the evaluation period, inputs the feature value into the first model and the second model stored in the storage portion, and calculates, by using output signals output from the first model and the second model, deviation degrees of the output signals from a measured value measured in the evaluation period, and
    wherein the controller displays the deviation degrees on the display apparatus in time series.

24. A method of manufacturing a product in which the product is manufactured by using the information processing apparatus according to claim 18 and the mechanical equipment.

* * * * *